US012681157B2

(12) United States Patent
Reimann

(10) Patent No.: US 12,681,157 B2
(45) Date of Patent: Jul. 14, 2026

(54) METHOD FOR ONE-SIDED RADIO-BASED DISTANCE MEASUREMENT

(71) Applicant: LAMBDA:4 ENTWICKLUNGEN GMBH, Hamburg (DE)

(72) Inventor: Rönne Reimann, Hamburg (DE)

(73) Assignee: Lambda:4 Entwicklungen GmbH, Hamburg (DE)

( * ) Notice: Subject to any disclaimer, the term of this patent is extended or adjusted under 35 U.S.C. 154(b) by 603 days.

(21) Appl. No.: 18/250,886

(22) PCT Filed: Nov. 3, 2021

(86) PCT No.: PCT/EP2021/080520
§ 371 (c)(1),
(2) Date: Jun. 23, 2023

(87) PCT Pub. No.: WO2022/096511
PCT Pub. Date: May 12, 2022

(65) Prior Publication Data
US 2023/0408666 A1    Dec. 21, 2023

(30) Foreign Application Priority Data

Nov. 4, 2020    (WO) ................. PCT/EP2020/081015
Nov. 4, 2020    (WO) ................. PCT/EP2020/081016

(51) Int. Cl.
*G01S 11/08*        (2006.01)
(52) U.S. Cl.
CPC .................................... *G01S 11/08* (2013.01)
(58) Field of Classification Search
CPC ................................................ G01S 11/02–10
See application file for complete search history.

(56) References Cited

U.S. PATENT DOCUMENTS 4,087,816 A * 5/1978 Barszczewski ......... G01S 11/02
                                                    342/393
6,449,558 B1 * 9/2002 Small .................... G01S 5/0289
                                                    342/357.44
(Continued)

FOREIGN PATENT DOCUMENTS

DE      112014004426        6/2016
EP      0664625             7/1995
(Continued)

OTHER PUBLICATIONS

P. Zand, J. Romme, J. Govers, F. Pasveer and G. Dolmans, "A high-accuracy phase-based ranging solution with Bluetooth Low Energy (BLE)," 2019 IEEE Wireless Communications and Networking Conference (WCNC), Marrakesh, Morocco, 2019, pp. 1-8, doi: 10.1109/WCNC.2019.8885791. (Year: 2019).*
(Continued)

*Primary Examiner* — Cassi J Galt
(74) *Attorney, Agent, or Firm* — Sand, Sebolt & Wernow Co., LPA

(57) ABSTRACT

A method for one-sided radio-based distance measurement. The object is to speed up the determination of the distance between a first object and a second object, to enable greater accuracy and/or to enable or improve the determination, even in the event of interference, particularly in the case of one-sided and/or asymmetric interference in the radio connection. The method is carried out largely without radio signals in a transmission direction. The method includes use of a transit time measurement between the first object and the second object to eliminate the ambiguity of the distance measurement; the distance measurement being carried out on the basis of a change in the phase shift, in particular relative to the frequency change, of the signal propagation
(Continued)

from the first object to the second object as a result of a frequency change.

17 Claims, 1 Drawing Sheet

(56) References Cited

U.S. PATENT DOCUMENTS

| | | | |
|---|---|---|---|
| 6,489,923 | B1 | 12/2002 | Bevan |
| 8,249,618 | B2 * | 8/2012 | Fireaizen .................. G01S 1/20 |
| | | | 342/393 |
| 2002/0008615 | A1 | 1/2002 | Heide et al. |
| 2012/0019413 | A1 | 1/2012 | Fretenburg |
| 2012/0320335 | A1 | 12/2012 | Weeber et al. |
| 2013/0103271 | A1 * | 4/2013 | Best ........................ B66C 13/40 |
| | | | 701/50 |
| 2020/0099561 | A1 | 3/2020 | Lee et al. |
| 2020/0118372 | A1 | 4/2020 | Stitt et al. |

FOREIGN PATENT DOCUMENTS

| | | |
|---|---|---|
| EP | 1650581 | 4/2006 |
| EP | 2212705 | 8/2010 |
| EP | 2525238 | 11/2012 |
| EP | 2710398 | 3/2014 |
| EP | 3502736 | 6/2019 |
| EP | 3564703 | 11/2019 |
| EP | 3564706 | 11/2019 |
| EP | 3564707 | 11/2019 |
| WO | 2009067997 | 6/2009 |
| WO | 2010025273 | 3/2010 |
| WO | 2012155993 | 11/2012 |
| WO | 2014130196 | 8/2014 |
| WO | 2019238789 | 12/2019 |
| WO | 2020060686 | 3/2020 |
| WO | 2020156939 | 8/2020 |
| WO | 2020165134 | 8/2020 |
| WO | 2022016161 | 1/2022 |
| WO | 2022096091 | 5/2022 |
| WO | 2022096509 | 5/2022 |
| WO | 2022096510 | 5/2022 |
| WO | 2022096512 | 5/2022 |
| WO | 2022096513 | 5/2022 |
| WO | 2022096514 | 5/2022 |
| WO | 2022096515 | 5/2022 |

OTHER PUBLICATIONS

Synchronization in Wireless Sensor Networks using Bluetooth, Casas et al., Third International Workshop on Intelligent Solutions in Embedded Systems, 2005., ISBN: 3-90246303-1, May 1, 2005.

* cited by examiner

METHOD FOR ONE-SIDED RADIO-BASED DISTANCE MEASUREMENT

TECHNICAL FIELD

The invention relates to a method for one-sided radio-based distance measurement.

BACKGROUND ART

Determining the distance between two objects based on the exchange of radio signals between the objects is known.

Synchronizing timers in two objects is also known, both via wired and wireless connections. For example, there is the NTP protocol. Within the scope of a Bluetooth connection, too, a synchronization is provided in which each object has a freely running 28-bit clock with a cycle of 3.2 kHz and each object ascertains its offset relative to a central clock, and corrects the offset on a regular basis. In this case, synchronization with an accuracy of approximately 125 ns is achieved. Improved time synchronization is also known, for example, from DE1 1 201 4004426T5 or "Synchronization in Wireless Sensor Networks Using Bluetooth," Casas et al., Third International Workshop on Intelligent Solutions in Embedded Systems, 2005. ISBN: 3-90246303-1. This can be used for saving energy, for example, in that an object is kept ready to receive only in certain time slices, which are known to the other object, in order to send at corresponding times. Synchronization of the clocks is also still possible, at least with a one-sided relatively strong interference on the radio channel, although the distance measurement becomes impossible or very inaccurate, or takes a very long time during such interference. Synchronization to a clock-cycle of a received signal at the receiver of the signal must be clearly differentiated from the accuracy of a time synchronization. In this case, there is no synchronization of two clocks at two objects, but rather the receiving object is set such that it is synchronized with the incoming signal. The signal time-of-flight does not play a role here, since for that it is irrelevant when the signal was sent and/or how long it took to be transmitted.

Calculating a distance from an autocorrelation matrix of a signal roundtrip time using mathematical methods, such as CAPON or MUSIC, is also known.

In this context, the phase shifts of the signal's outbound and return trips are summed, usually following an approximate correction of a 180° ambiguity problem. From the complex measured values created therefrom and from a determination of an amplitude, an autocorrelation matrix is then created, on the basis of which a distance is then calculated.

SUMMARY OF THE INVENTION

In order to speed up the determination of the distance and/or to increase the accuracy of the determination of the distance between two objects and/or in the event of reception interference, it is desirable to carry out the distance determination largely without consideration of the radio signals of one transmission direction. The object of the present invention is to speed up the determination of the distance, to enable this with greater accuracy, and/or to enable or improve it even in the event of interference, in particular, one-sided and/or asymmetric interference, respectively, in the radio connection.

Surprisingly, the inventor has determined that it is possible to not consider one transmission direction between time- and/or clock-cycle-synchronized objects, particularly with phase-coherent frequency change. This also means that frequency hopping of an object can be carried out followed by frequency hopping of a second of the objects without compromising accuracy, instead of frequently changing the transmitter and receiver role. In particular, frequency hopping is understood as sending successively on different frequencies. This ensures a more rapid measurement, since the switching times of the transceivers can also be largely disregarded, and enables the distance to be determined even in the event of strong interference on the radio channel.

It also enables a plurality of objects to determine the distances between one another rapidly and accurately, since the frequency hopping of each one of the objects can be used for distance determination by all of the other objects.

The problem is solved by a method for distance determination between two or more objects, wherein the objects are or will be time- and/or clock-cycle-synchronized, particularly to 10 ns or better, particularly in the range between 10 ns and 100 ps, and wherein a first object emits signals on multiple frequencies and a second object receives these signals, and therefrom the distance between the first and second object is determined, wherein the ambiguity is eliminated by means of a time-of-flight measurement, particularly pulse time-of-flight measurement.

The method for distance determination between at least two objects, wherein the at least two objects are and/or will be time- and/or clock-cycle-synchronized, and wherein a first object emits at least one signal on each of a first and a second frequency, and a second object receives the signals of the first object and carries out phase measurements on them, is characterized in that the first object changes between the first and the second frequencies in a phase-coherent manner, i.e., with a phase jump of zero, and/or changes so that upon changing frequencies, the phase jump is known and/or determined upon sending, and in that the distance between the first and second object is determined from the phase change caused by the frequency change from the first to the second frequency, and that the ambiguity of the distance determination is eliminated by means of a measurement of the signal time-of-flight between a first and second object, and/or by means of the knowledge of at least one point in time at which the emission of features of the signals took place. For that purpose, the signal time-of-flight is determined particularly by means of the knowledge of at least one point in time at which features of the signals of the first object are emitted, in particular by ascertaining when a feature is received at the second object, and identifying the difference between the point in time of the reception and the emission.

The problem is also solved by a use of a time-of-flight measurement between a first and a second object for eliminating the ambiguity of a distance measurement, wherein the distance measurement is carried out on the basis of the change in the phase shift, in particular relative to the frequency change, of the signal propagation from the first to the second object as a result of a frequency change.

The phase change caused by, or arising as a result of, the frequency change is caused in that, particularly when both measurements are at approximately equal distance, a different number of wave packets fit within the distance and consequently the phase shift, which is caused by the distance, ends up being different between the frequencies. This change in the phase shift as a result of the frequency is the phase change caused by the frequency change. In this context, problems result during measuring since in each case, the phase measurement is dependent on a reference, and a frequently undefined phase jump can result when switching over to transmit the various frequencies. Switching over for transmitting and, particularly also for receiving, is thus preferably done phase-coherently, i.e., with a phase jump of zero. But determining or knowing the phase jump is also sufficient. Then one can determine the phase change caused by the frequency change, through the measured phase change corrected by the phase jump upon switchover of the transmitter, and the phase jump upon switchover at the receiver for measuring the measured phase change.

For example, the distance can be [determined] by means of $$Distance=(phase\ shift\ between\ two\ frequencies)/2Pi/$$
$$(difference\ between\ the\ two\ frequencies)*c$$

where c is the speed of light

The distance determination on the basis of this phase change has an ambiguity that results particularly once the distance=c/(difference between first and second frequencies) is achieved, where c is the speed of light. This ambiguity can be resolved by a time-of-flight measurement, since these are generally more accurate than distance=c/(difference between first and second frequencies).

In particular, the time-of-flight measurement is carried out with an accuracy greater than c/(difference between first and second frequencies). This can be achieved by selecting appropriate qualities of measurement apparatus, particularly by selecting an appropriately accurate timer and/or appropriately accurate time synchronization and/or time drift correction. Appropriate methods are known from the prior art.

Advantageously, the time synchronization between the first and second object is achieved and/or exists accordingly with an accuracy greater than 2 µs, particularly in the range from 0.1 to 2 µs. The time synchronization lies particularly in the range from to 10 ns, particularly in the range from 0.05 to 5 ns, and/or the drift of the timer is determined in the first and third object and taken into account for the time-of-flight measurement, the accuracy of the drift determination lies particularly in the range from to 100 ppb, particularly in the range from 1 to 10 ppb. This can be achieved by phase-coherent switching and evaluation thereof at the receiver. For this purpose, the second object transmits particularly at least one signal on a first frequency and on a second frequency, which do not have to coincide with those of the first object, but preferably do so, and switches between them in a phase-coherent manner, i.e., with a phase jump of zero, and/or such that the phase jump upon changing the frequencies is known and/or determined upon transmitting.

The phase difference or phase jump when switching between two frequencies generally arises due to technical reasons, but can also be prevented. The switching is between two frequencies can be carried out with a short interruption or interruption-free. At the time of the interruption-free change, the phase jumps, or during the change with interruption, the phase of the signals theoretically imagined to continue during the interruption, jumps before and after switching. A defined phase jump exists at the change timepoint without interruption, or at a theoretical change timepoint during the interruption, particularly in the middle of the interruption and/or at the end of the signal before the interruption or at the beginning of the signal after the interruption. This is the phase difference.

Especially advantageously, the first and second object change between first and second frequencies phase-coherently and/or such that the phase jump is known and/or determined upon change of the frequencies during transmitting and/or upon receiving, and particularly the phases measured upon reception are corrected by this phase jump or these phase jumps.

Especially advantageously, the method is carried out repeatedly with a plurality of pairs of first and second frequency. The accuracy can be increased in this way, for example by averaging and/or reducing the ambiguity.

Advantageously, signal components of the first and/or second object at frequencies with less than 40%, or at least signals with less than 20%, particularly less than 40%, of the mean energy of the signals, and/or signals with more than 140%, particularly more than 120%, of the mean energy remain unconsidered, i.e., are left out in the distance determination, and therefore particularly in the formation of measurement value vectors and autocorrelation matrices. In this manner, the influence of interference and inaccuracies of the electronic assemblies used can be reduced further.

Preferably, a plurality of objects carry out the method together. This saves energy and time.

Distance and distance are used synonymously to refer to the distance between two objects.

Features of the signal are to be understood particularly as changes of the signal, such as change in amplitude, polarization, the emitting antenna (change between antennas), frequency, and/or phase. However, aggregated groups of features can also be used, which augment the robustness of the method in some situations. For example, modulated packets or synchronization characters can be used as groups of features.

The invention also is particularly characterized in that only the signals sent by the first object are used for determining the phase change and/or the distance.

In particular, the first and/or second object transmits a frequency hopping by transmitting, in particular, approximately identical frequencies, wherein the sequence of these frequencies in the frequency hopping of the first and second object is not decisive. The frequencies are approximately identical particularly when they differ by less than 5%, particularly less than 1% of the lower frequency, and/or less than 17 MHz, particularly less than 10 MHz, particularly less than 9 MHz, particularly less than 2 MHz. For example, Object A can thus use the frequencies FA1, FA2 to FAn, and Object B can use the frequencies FB1, FB2 to FBn, wherein 95% FAx=FBx<=105% FAx, with x from 1 to n.

The method is particularly carried out when the first object is transmitting with reversed roles of the first and second object.

Frequency hopping particularly refers to consecutively transmitting on different frequencies, of which pairs particularly always constitute a first and a second frequency.

In particular, the frequencies, particularly of the frequency hopping(s), lie in a spectrum from 25 to 100 MHz, in particular they completely span such a spectrum. Particularly the frequencies, particularly of the frequency hopping, lie in the range from 2 to 6 GHz. A spacing in the range from 0.1 to 17 MHz, particularly in the range from 0.5 to 10 MHz lies particularly between adjacent but not necessarily consecutive frequencies, particularly of the frequency hopping, and/or between the first and second frequency.

Phase-coherent switching or changing between two frequencies is understood to mean, particularly, that the phase after the switching is known relative to the phase is position before the switching. This is the case when the change of phase when switching is zero, or is equivalent to a previously known value, or is measured at the transmitter. In this manner, further measurements of the phase at the transmitter can be avoided, and the calculation can be simplified, particularly when frequencies are switched between without phase change. It is advantageous not only for the transmitting object to switch in a phase-coherent manner, but also for the receiving object to do so, in particular a PLL is switched in a phase-coherent manner in each object.

Alternatively, switching can be preferably phase-coherent, but also not, and the change in phase can be determined locally, i.e., particularly at the transmitter before the transmission and/or at the receiver relative to the PLL of the receiver, and this change can be corrected in the calculation.

For example, when the point in time of the phase-coherent change or of the change with measured phase jump at the transmitting object is known, and when the change in the received signal is determined at the received object, the time between transmitting and receiving the change is determined, which time represents the signal time-of-flight (ToF), and the phase shift is also determined, which results solely from the signal flight. The distance can be directly determined from the signal time-of-flight by means of the speed of light. This is also possible via the phase shift, however with an ambiguity, which is generally more accurate. The ambiguity accompanying the phase-based measurement can be reduced by using multiple frequencies. A particularly accurate and robust distance measurement can be realized by combining the signal time-of-flight measurements and phase-based measurements.

The signals are radio signals, in particular.

Moreover, surprisingly, it was established that the distances obtained from the one-sided distance measurement or the distance measurement according to the invention described here, are dependent upon the frequency used for the distance determination when standard commercial transceivers are used, such as the somewhat older cc2500 or the current cc26xx by Texas Instruments or the Kw35/36/37/38 by NXP or the DA1469x by Dialog. In this context, inaccuracies in the transceivers also seem to result in calculated distances that are less than the actual distance, but only with those frequencies whose transmission channel is highly attenuated, such that these can be eliminated from the calculation without issue.

Therefore, it is advantageous for the distance determination not to use signal components of the object whose signals are used for the distance determination, for the distance determination in certain cases, and specifically to not use such components that lie above an upper power limit and/or to not use such components that lie below a lower power limit. These limits can be predetermined, or can be determined based on the received signals, and particularly can be above or below the mean received power, and can be particularly at least 20% above the mean received power (upper power limit) and/or at least 20% above the mean received power (lower power limit).

Preferably, not taken into account are signal components at frequencies received with less than 40%, or at least signals received with less than 20%, particularly less than 40%, of the mean energy of the signals, and/or signals received with greater than 140%, particularly with greater than 120% of the mean energy. Advantageously, the lower power limit lies in the range from 5 to 50% of the mean power of the received signals, and/or the upper lower limit lies in the range from 120 to 200% of the mean power of the received signals.

In another embodiment, of the signals, particularly those selected in the decision, the x % of the signals with the smallest received amplitude are sorted out and not used, and/or the y % of the signals with the greatest received amplitude are sorted out and not used. It has been shown to be particularly advantageous when the sum of x and y is not less than 10 and/or does not exceed 75, and/or x lies in the range from 10 to and/or y lies in the range from 20 to 50. In most situations, high accuracy and reliable distance determination can be obtained with these values.

Preferably the first and/or second, or each of the two objects, sends the signals on multiple frequencies successively and/or consecutively, in particular directly is consecutively. In particular, when sending is taking place by the first and second object, all signals of the first or of the second object are sent first, then those of the other. If one is working with multiple objects, in particular they all send a frequency hopping successively, particularly one frequency hopping each. Influences of environmental or distance changes, and of movements of one or both objects, can be thus reduced.

Advantageously, at no time does the bandwidth of the signals exceed 50 MHz, particularly 25 MHz. Consequently energy can be saved, interference with other processes can be prevented, and simple components can be used compared to broadband methods.

Preferably, a time- and/or clock-cycle synchronization and/or correction is carried out between the two objects before, after and/or while the method is carried out. This augments the accuracy of the method. Preferably, a drift of the clock of the first and/or second object, or a difference in the drift of the clock of the first and of the second object, is also determined and considered in the distance determination or time-of-flight measurement. This augments the accuracy of the method.

The drift of the oscillators can be corrected for the phase measurement as known in the prior art and further improves the accuracy.

Advantageously, the method is carried out such that the frequency spacing between two consecutive frequencies of the multiple frequencies is at least 0.1 MHz and/or a maximum of 17 MHz, in particular is 10 MHz, and/or the multiple frequencies are at least five frequencies and/or a maximum of 200 frequencies, and/or wherein the multiple frequencies span a frequency band of at least two MHz and/or a maximum of 100 MHz. Thus can a balanced measure be found between bandwidth requirement, which imposes requirements for available frequencies and hardware, and accuracy.

Preferably, the method is carried out such that the accuracy of the distance determination based on the time-of-flight measurement lies in the range from 0.3 m to 3 m, in particular at least for distances in the range from 0 to 50 m. The advantages of the invention are brought to bear particularly in these ranges.

It is preferable to apply high-resolution methods, such MUSIC or CAPON, which can calculate a distance on the basis of an autocorrelation matrix, particularly a complex one. Advantageously, for every signal that is to remain unconsidered which is received at the second and/or first object, a value proportional to its amplitude and a phase value are determined, and particularly therefrom, in each case, if applicable after correction of a phase jump during the frequency change or of a determinable phase measurement error due to drift of the timer or frequency encoders, a complex number is determined from which at least one measurement value vector is constructed, from which in each case an autocorrelation matrix is created. In particular, the autocorrelation matrices of an object, particularly those of the receiver of a frequency hopping of another object, are summed. In particular, the, potentially summed, autocorrelation matrix for the reception of the frequency hopping of object X at object Y, is aggregated with the, potentially summed, autocorrelation matrix for the reception of the frequency hopping of object Y at object X, particularly is summed, and this aggregated autocorrelation matrix is used for the distance determination between object X and Y.

In particular, autocorrelation matrix is used to determine the distance by means of known methods, for example MUSIC, CAPON, comparison with, distance calculation in the virtual space to, and/or projection onto, the emitting and/or receiving characteristics. Advantageously, the distance calculation occurs in virtual space by means of eigenvalue, or eigenvector determination, of the at least one autocorrelation matrix and/or Fourier transformation of the complex values.

Such approaches are advantageous for achieving a reliable determination, particularly with multipath signal propagation.

Advantageously, a mean value is determined from multiple distance determinations, and/or the measurements are averaged in order to determine a distance value.

When a position finding is striven for, it is advantageous to carry out the method according to the invention between a plurality of pairs of objects, wherein one object of each pair is an object that is involved in all pairs, and wherein the ascertained is distances of the pairs are used to carry out a mapping and/or position determination of at least one of the objects. It is then advantageous, in particular, to make these pair-wise measurements simultaneously, wherein the sending does not take place simultaneously, but rather all objects carry out at least one frequency hopping, in particular, directly consecutively.

The problem is also solved by one or two objects, each of which is configured with transmission and receiving means and a controller, configured for carrying out the method according to the invention.

Advantageously, the objects are parts of a data transmission system, particularly a Bluetooth, WLAN, or wireless, data transmission system. Preferably, the signals are signals of the data transmission system, particularly of a data transmission standard, for example a wireless standard, WLAN, or Bluetooth, that is used for data transmission according to the data transmission standard.

Advantageously, the signals are transmitted over multiple antenna paths, particularly at least three, particularly with multiple antennas, particularly successively, sent at the sending object and/or received at the receiving object with multiple antennas.

The calculation is done as follows, for example: In the averaging of the measured distances, the measurements of the received signals with less than, e.g., 40% of the mean energy of the received signals, are ignored. Thus measurements on frequencies with strongly attenuated transmission channel are disregarded.

DETAILED DESCRIPTION

Figure 1:
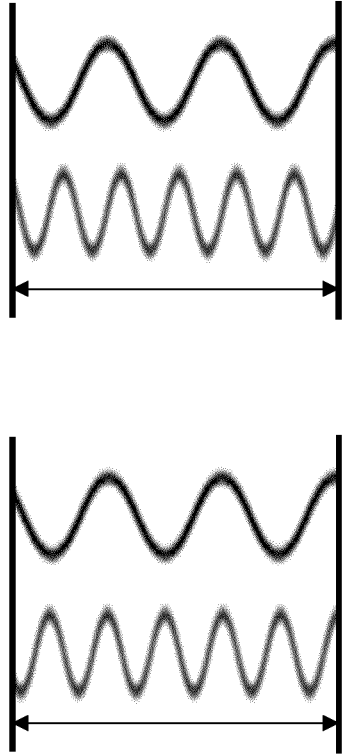
FIG. 1 shows, purely as an example and schematically, an illustration of the change in phase shift due to a frequency change.

FIG. 1 shows, purely as an example and schematically, an illustration of the change in phase shift due to a frequency change. In the upper depiction, a wave at a lower frequency (above) and a wave at a lower frequency (therebelow) is shown between two objects, respectively marked by a vertical line with a distance marked by a double-ended arrow. It is evident that the phase change from the transmitter to the receiver ends up being different at the frequencies. In the lower image, the lower wave is shown phase-shifted in order to also emphasize the change in the received phase based on the transmitted phase.

Figure 2:
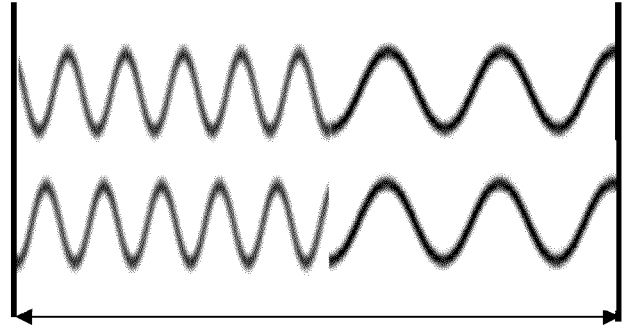
FIG. 2 emphasizes the influence of the phase jump when switching.

FIG. 2 emphasizes the influence of the phase jump when switching. In FIG. 2, an object is respectively shown on the right and left as vertical lines and between them, their distance is illustrated by a double-ended arrow. A phase-coherent frequency switch is illustrated above in FIG. 2, and a switch with phase jump is illustrated below in FIG. 2. It is evident that the phase jump has an effect on the change in phase difference between the phase at the first and at the second object when switching frequencies. This can be mathematically corrected, however, if the phase jump is known.

The invention claimed is:

1. A method for distance determination between at least two objects, wherein the at least two objects are time- or clock-cycle-synchronized or at least one time- or clock synchronization or correction is carried out between the at least two objects, the method comprising the steps of:

emitting a plurality of signals by a first object of the at least two objects, wherein at least a first signal is emitted on a first frequency and at least a second signal is emitted on a second frequency different than the first frequency;

wherein for emitting the first signal and the second signal, the first object switches between the first frequency and the second frequency in a phase-coherent manner with a phase jump of zero, or changes so that upon changing frequencies, the phase jump is known or determined upon transmission;

receiving the plurality of signals emitted by the first object at a second object of the at least two objects and carrying out phase measurements on at least the first signal and the second signal upon receipt to determine a first phase value for the first signal and a second phase value for the second signal respectively;

performing a time-of-flight measurement based on knowledge of at least one point in time at which emission of features of the first signal or the second signal took place, thereby determining a distance estimate;

calculating a phase shift between the first phase value and the second phase;

determining a distance between the first object and the second object based on the phase shift between the first phase value and the second phase value in relation to a difference in frequency between the first frequency and the second frequency, the distance having an ambiguity; and resolving the ambiguity in the distance by comparing the distance to the distance estimate determined by the time-of-flight measurement.

2. The method according to claim 1, wherein each signal of the plurality of signals that is received with an energy of less than 20% or more than 140% of a mean energy of all received signals of the plurality of signals is not used as either the first signal or the second signal for the distance determination.

3. The method according to claim 1, wherein the plurality of signals is emitted by the first object on multiple frequencies successively or consecutively.

4. The method according to claim 3, wherein a frequency spacing between two consecutive frequencies of the multiple frequencies is at least 0.1 MHz or a maximum of 17 MHz, or wherein the multiple frequencies span a frequency band with a bandwidth of at least two MHz or a maximum of 100 MHz.

5. The method according to claim 4, wherein at no time the bandwidth of the signals exceeds 50 MHz.

6. The method according to claim 5, wherein at no time the bandwidth exceeds 25 MHz.

7. The method according to claim 3, wherein the multiple frequencies are at least five frequencies or a maximum of 200 frequencies.

8. The method according to claim 1, wherein the at least one time- or clock-cycle synchronization or correction between the at least two objects is performed before, after or while performing the step of emitting the first signal and the second signal.

9. The method according to claim 1, wherein an accuracy of the time-of-flight measurement lies in a range from 0.3 m to 3 m.

10. The method according to claim 1, wherein a time drift of at least one or both of the at least two objects or between the at least two objects is determined or corrected or is taken into account for determining the distance.

11. The method according to claim 1, wherein a mean value for the distance between the first object and the second object is determined from multiple distance determinations performed using the first object and the second object.

12. The method according to claim 11, wherein the multiple distance determinations are performed using same or different first frequencies and same or different second frequencies.

13. The method according to claim 1, wherein each signal of the plurality of signals that is received at the second object with a received power below a predetermined or calculated lower power limit or above a predetermined or calculated upper power limit is not used as either the first signal or the second signal or are not taken into account for determining the distance.

14. The method according to claim 1, further comprising:
forming a plurality of object pairs;
wherein the at least two objects comprise more than one first object or more than one second object;
wherein each object pair of the plurality of object pairs comprises one first object and one second object, wherein all pairs of the plurality of pairs either comprise the same first object or comprise the same second object; and
wherein an individual distance between the respective first object and the second object is determined for each of the object pairs of the plurality of object pairs and the individual distances are used to carry out a mapping or position determination of the first objects and the second objects in relation each other.

15. An object pair configured for carrying out the method according to claim 1.

16. The method according to claim 1, further including the step of, prior to calculating the phase shift between the first and second phase value, modifying one or both of the first and second phase value based on the phase jump known or determined upon emitting.

17. The method according to claim 1, wherein one or both of the first and second signal received at the second object comprises more than one signal component, wherein, of said one or more signal components of respective first or second signals, signal components having an energy of less than 40% of a maximum energy of all of the respective signal components of said respective first or second signal are not taken into account for determining the distance.

\*  \*  \*  \*  \*